United States Patent
Motszko et al.

(10) Patent No.: US 7,189,158 B2
(45) Date of Patent: Mar. 13, 2007

(54) AIRFLOW CONTROL SYSTEM

(75) Inventors: Sean Ronald Motszko, Leaf River, IL (US); Ryan Patrick McEnaney, Peoria, IL (US); Jeffrey Alan Brush, Dunlap, IL (US); Daniel E. Zimmermann, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/952,098

(22) Filed: Sep. 29, 2004

(65) Prior Publication Data
US 2006/0073780 A1    Apr. 6, 2006

(51) Int. Cl.
*F24F 13/12* (2006.01)

(52) U.S. Cl. ............. 454/143; 454/258; 454/334; 454/274; 454/288; 165/203; 165/208; 237/1 B

(58) Field of Classification Search ............ 454/87, 454/143, 156, 239, 256, 258, 333, 334, 273, 454/274, 287, 288, 313, 314, 324; 237/49.3, 237/1 B; 165/203, 205, 208
See application file for complete search history.

(56) References Cited

U.S. PATENT DOCUMENTS

| | | | |
|---|---|---|---|
| 911,457 A | 2/1909 | Stewart | |
| 1,740,626 A | 12/1929 | Petrelli | |
| 2,223,940 A * | 12/1940 | Ragsdale et al. | 454/87 |
| 2,976,795 A | 3/1961 | Brugler | |
| 3,363,536 A * | 1/1968 | Dean, Jr. | 454/334 |
| 3,564,770 A | 2/1971 | Korbelic | |
| 3,656,541 A | 4/1972 | Coyle et al. | |
| 4,382,463 A * | 5/1983 | Ikebukuro | 165/203 |
| 4,406,397 A * | 9/1983 | Kamata et al. | 236/1 B |
| 4,407,187 A * | 10/1983 | Horney | 454/324 |
| 4,570,450 A | 2/1986 | Takemi et al. | |
| 4,666,477 A | 5/1987 | Lough | |
| 4,997,030 A * | 3/1991 | Goto et al. | 165/208 |
| 5,014,608 A | 5/1991 | Benson et al. | |
| 5,062,473 A | 11/1991 | Ostrand et al. | |
| 5,207,614 A | 5/1993 | Passadore | |
| 5,218,998 A * | 6/1993 | Bakken et al. | 137/625.28 |
| 5,427,146 A | 6/1995 | Bakken et al. | |
| 5,619,862 A | 4/1997 | Ruger et al. | |
| 5,709,601 A | 1/1998 | Heck | |
| 5,810,245 A * | 9/1998 | Heitman et al. | 236/49.3 |
| 5,878,806 A * | 3/1999 | Denk et al. | 165/42 |
| 5,984,775 A | 11/1999 | Lee et al. | |

(Continued)

*Primary Examiner*—Gregory Wilson
(74) *Attorney, Agent, or Firm*—Finnegan, Henderson, Farabow, Garrett & Dunner

(57) ABSTRACT

A dual airflow control system for an environment having a first air zone and a second air zone. The system includes a first input device operable to generate a first input signal indicative of a desired airflow to the first zone and a second input device operable to generate a second input signal indicative of a desired airflow to the second zone. First and second flow regulators are configured to regulate airflow to the first and second zones, respectively, such that the first and second regulators selectively provide the airflow to each of the first and second zones based on the first and second input signals. A single actuator is associated with the first and second flow regulators. The actuator is operable to simultaneously actuate the first and second flow regulators based on an input from the first and second input devices to allow the desired airflows to the first and the second zones.

21 Claims, 8 Drawing Sheets

U.S. PATENT DOCUMENTS 6,003,593 A     12/1999  Halligan
6,175,782 B1 *   1/2001  Obradovich et al. ........... 701/1
6,196,308 B1     3/2001  Halligan
6,302,785 B1 *  10/2001  McKinney et al. ......... 454/334
6,910,340 B2 *   6/2005  Nowak et al. ................ 62/115

* cited by examiner

AIRFLOW CONTROL SYSTEM

U.S. GOVERNMENT RIGHTS

This invention was made with government support under the terms of Contract No. DE-FC04-2000AL67017 awarded by the Department of Energy. The government may have certain rights in this invention.

TECHNICAL FIELD

This disclosure is directed to an airflow control system, and more particularly, an airflow control system that directs airflow to two separate zones of an environment such as a vehicle.

BACKGROUND

On-highway work machines, such as semi-tractor or class-8 trucks, are often equipped with a sleeper cabin disposed behind an operator cab. Heating and cooling systems for these machines often are configured to provide airflow to one of the operator cab and sleeper cabin independent of the other. Accordingly, an operator may control the heating and cooling in the two areas as desired.

One known system for independent control of the heating and cooling to an operator cab provides two separate heating and cooling systems: a first heating and cooling unit dedicated to the sleeper cabin; and a second heating and cooling unit dedicated to the operator cab. However, such a system requires two of every component, increasing the overall cost of the system.

Another known system includes a single heating or cooling system with outlet vents directed into the cab and the sleeper cabin. One example of such a system is disclosed in U.S. Pat. No. 6,196,308 to Halligan. The '308 patent discloses a system of heating and cooling both a sleeper cabin and an operator cab on an on-highway truck. The system is disposed below the operator's seat and includes one outlet vent directed to the sleeper cabin and another outlet vent directed into the operator cab. A first controllable blower pushes air from a common inlet into the operator cab and a second controllable blower pushes air from the common inlet into the sleeper cabin. Independent controls in each of the operator cab and the sleeper cabin control the airflow of the blower blowing air into that cab and cabin. However, maintaining two blowers in a single cooling system can be redundant and, because each component increases the cost of the system, can be more expensive than necessary. Further, having two blowers in the system may increase the likelihood that one of the blowers will experience mechanical or electrical problems over time.

This disclosure is directed to an airflow control system that overcomes one or more of the deficiencies of the prior art.

SUMMARY OF THE INVENTION

The present disclosure is directed toward a dual airflow control system for an environment having a first air zone and a second air zone. The system includes a first input device operable to generate a first input signal indicative of a desired airflow to the first zone and a second input device operable to generate a second input signal indicative of a desired airflow to the second zone. First and second flow regulators are configured to regulate airflow to the first and second zones, respectively, such that the first and second regulators selectively provide the airflow to each of the first and second zones based on the first and second input signals. A single actuator is associated with the first and second flow regulators. The actuator is operable to simultaneously actuate the first and second flow regulators based on an input from the first and second input devices to allow the desired airflows to the first and the second zones.

In another aspect, the present disclosure is directed toward a method of operating a dual airflow control system for a vehicle having a first air zone and a second air zone. The method includes generating a first input signal indicative of a desired airflow to the first zone and generating a second input signal indicative of a desired airflow to the second zone. Airflow to the first and second zones is regulated with a first and a second flow regulator, respectively, in a manner that selectively provides the airflow based on the first and second input signals. The first and second flow regulators are simultaneously actuated with a single actuator to allow the desired airflows to the first and the second zones based on the first and second input signals.

In another aspect, the present disclosure is directed toward a dual airflow control system for an environment having a first air zone and a second air zone. The system includes a first input device operable to generate a first input signal indicative of a desired airflow to the first zone and a second input device operable to generate a second input signal indicative of a desired airflow to the second zone. First and second flow regulators are configured to regulate airflow to the first and second zones, respectively, such that the first and second regulators selectively provide the airflow to each zone based on the first and second input signals. A single blower is configured to create an airflow for passage through both the first and second flow regulators based on the first and second input signals from the first and second input devices to provide the desired airflows to the first and second zones.

DETAILED DESCRIPTION

Reference will now be made in detail to embodiments of the present invention, examples of which are illustrated in the accompanying drawings. Wherever possible, the same reference numbers will be used throughout the drawings to refer to the same or like parts.

Figure 1:
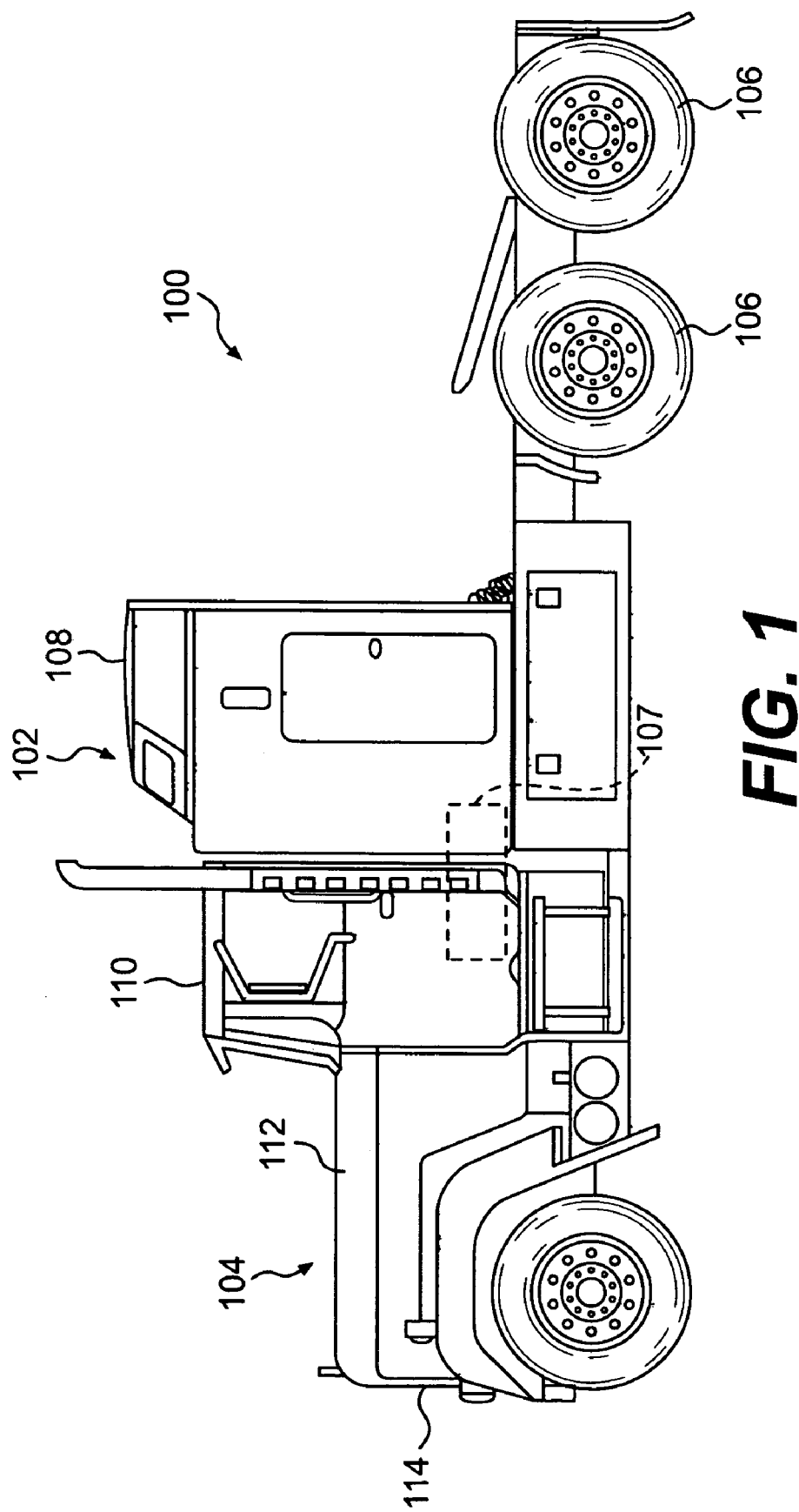
FIG. 1 is a pictorial representation of an exemplary on-highway vehicle.

An exemplary embodiment of an environment having a first and second air zone as an on-highway vehicle 100 is illustrated in FIG. 1. Although the vehicle 100 is shown as an on-highway truck, it could be an off-highway truck or other vehicle. In the exemplary embodiment shown, the vehicle 100 includes an operator compartment 102, a propulsion system housing 104, wheels 106, and an airflow control assembly 107. The operator compartment 102 may include a sleeper cabin 108 and an operator cab 110. The sleeper cabin 108 may be used as resting quarters for an operator of the vehicle 100. It may include a bed and/or other accommodations, as is known in the art. The operator cab 110 may be used by an operator when driving the vehicle 100.

The propulsion system housing 104 may include a hood 112 and a grill 114. An engine and/or other driving components may be contained within the propulsion system housing 104, as is known in the art.

The airflow control assembly 107 may be disposed within or adjacent to both the operator cab 110 and the sleeper cabin 108 and may be configured to provide airflow to each. For purposes of this description, the operator cab 110 and the sleeper cabin 108 will be described as separate air zones. As used herein, an air zone may be any region within a vehicle that is intended to be heated or cooled separately from another region. In the described embodiment, the area of the operator cab 110 will be referred to as a first air zone and the area of the sleeper cabin 108 will be referred to as a second air zone. Thus, the airflow control assembly 107 is disposed in a manner to provide heating and/or cooling airflow into both the first and second air zones.

Figure 2:
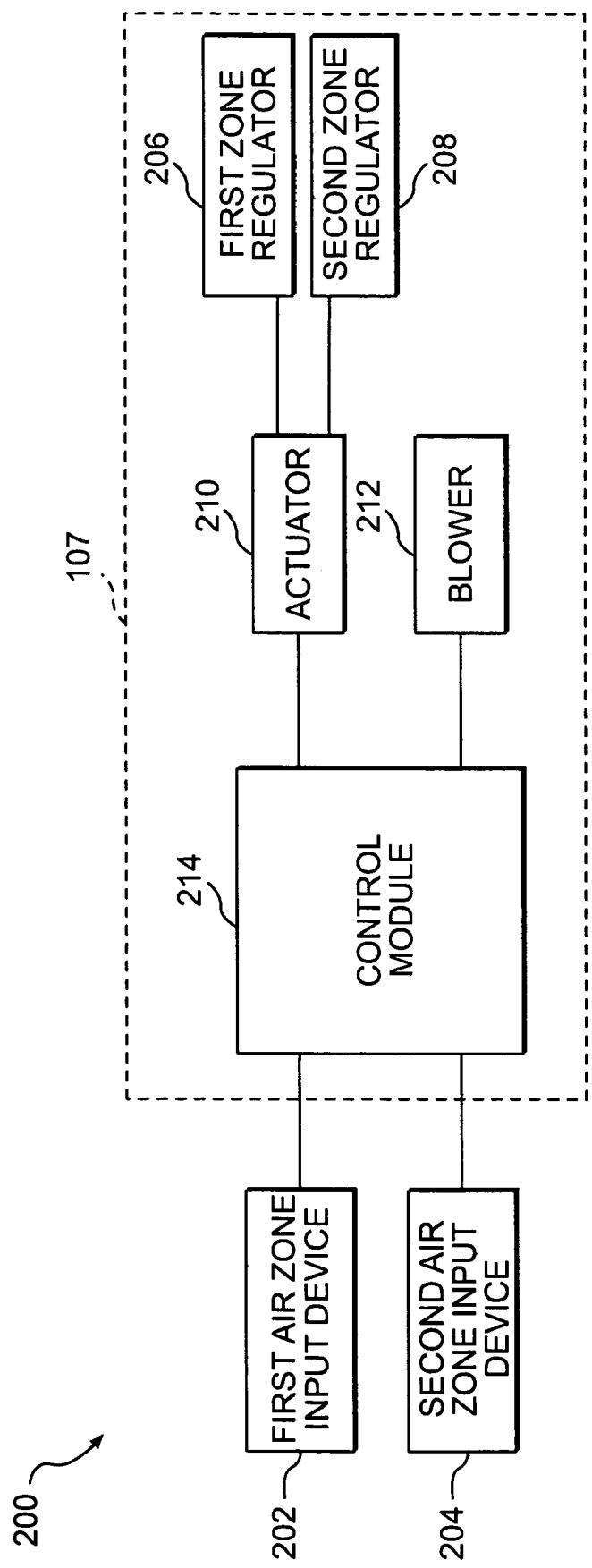
FIG. 2 is a block diagram showing an exemplary airflow control system.

FIG. 2 shows one exemplary embodiment of an airflow control system 200 including the airflow control assembly 107. The airflow control system 200 may be configured to provide dual airflow control to an environment. With reference to FIG. 2, the airflow control system 200 includes a first air zone input device 202, a second air zone input device 204, and the airflow control assembly 107. Each of the first and second air zone input devices 202, 204 may be disposed in independent instrument panels (not shown). In one exemplary embodiment, the first air zone input device 202 may be disposed within an instrument panel within the operator cab 110, while the second air zone input device 204 may be disposed within an instrument panel within the sleeper cabin 108. The first and second air zone input devices 202, 204 may be configured to control the amount of airflow to each respective air zone. To do this, each of the first and second input devices 202, 204 may be configured to generate an input signal based on an input from an operator and configured to send the signal to the airflow control assembly 107. The first and second air zone input devices 202, 204 may be, for example, dials, levers, switches, and/or other input devices configured to control airflow to the first and second air zones in the vehicle 100. It is also contemplated that the first and second input devices 202, 204 may be located in the same instrument panel or be similarly located in proximity to each other.

Figure 3:
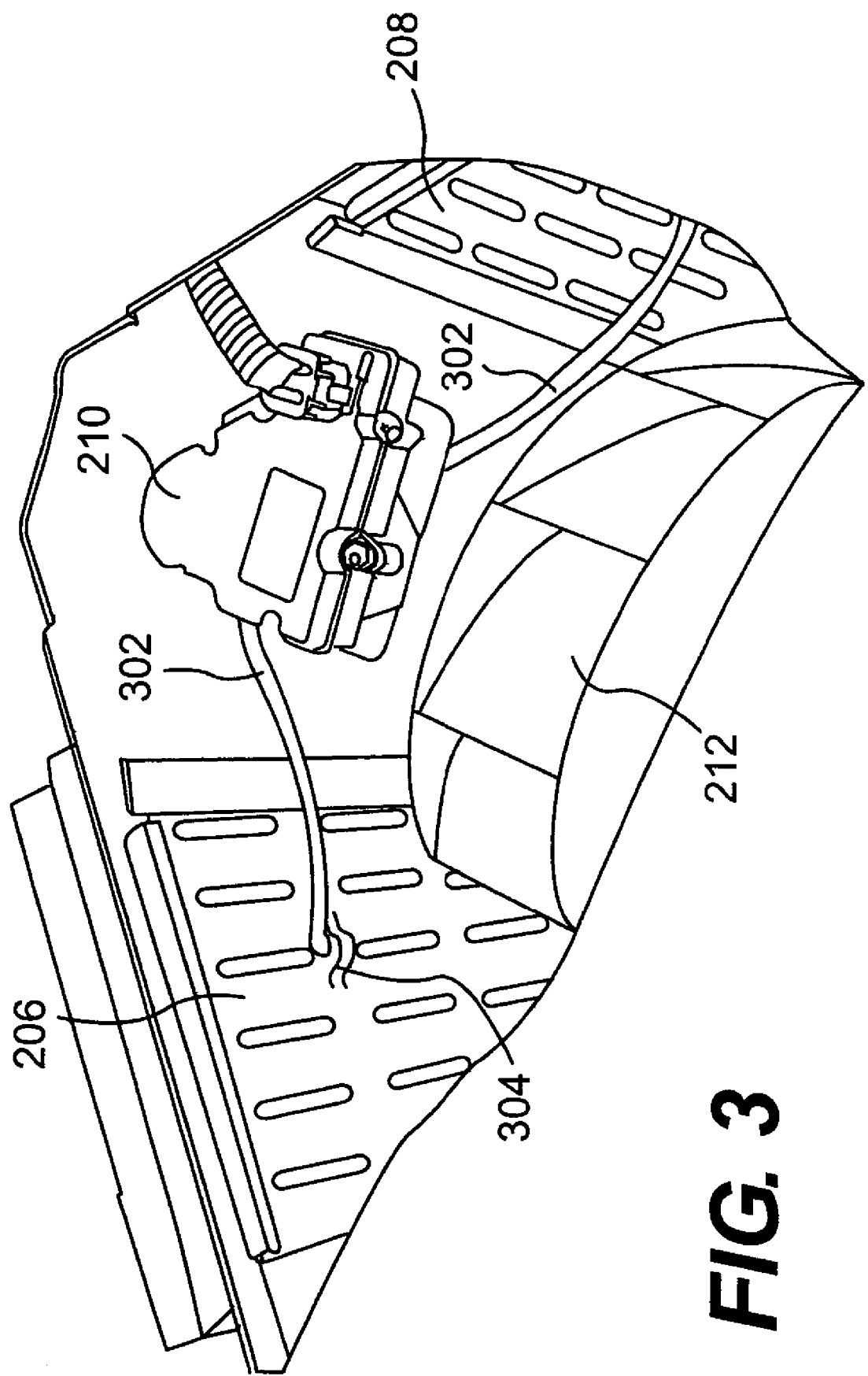
FIG. 3 is a pictorial representation of an exemplary arrangement of the control system of FIG. 2.

The airflow control assembly 107 includes a first zone regulator 206, a second zone regulator 208, an actuator 210, a blower 212, and a control module 214. FIG. 3 shows some of these components in an exemplary arrangement for providing airflow to the first and second air zones. With reference to FIG. 3, the regulators 206, 208 are disposed such that they are generally perpendicular to each other. Although not apparent from FIG. 3, they are disposed in a manner to direct airflow from the airflow control assembly 107 into the first and second air zones, respectively. It should be noted that the regulators 206, 208 need not be disposed perpendicular to each other, but may be adjacent to each other or otherwise disposed. In the exemplary arrangement of FIG. 3, the actuator 210 is disposed generally adjacent a vertex of the angle formed by the first and second zone regulators 206, 208. The blower 212 is disposed generally between the regulators 206, 208 and is configured to blow air at each.

One exemplary embodiment of the regulators 206, 208 is described with reference to FIGS. 4A–4C. For explanation purposes only, the regulator in FIGS. 4A–4C will be referred to as the first zone regulator 206. Nevertheless, it should be apparent that the second zone regulator 208 may be substantially identical to the first zone regulator 206.

Figure 4A:
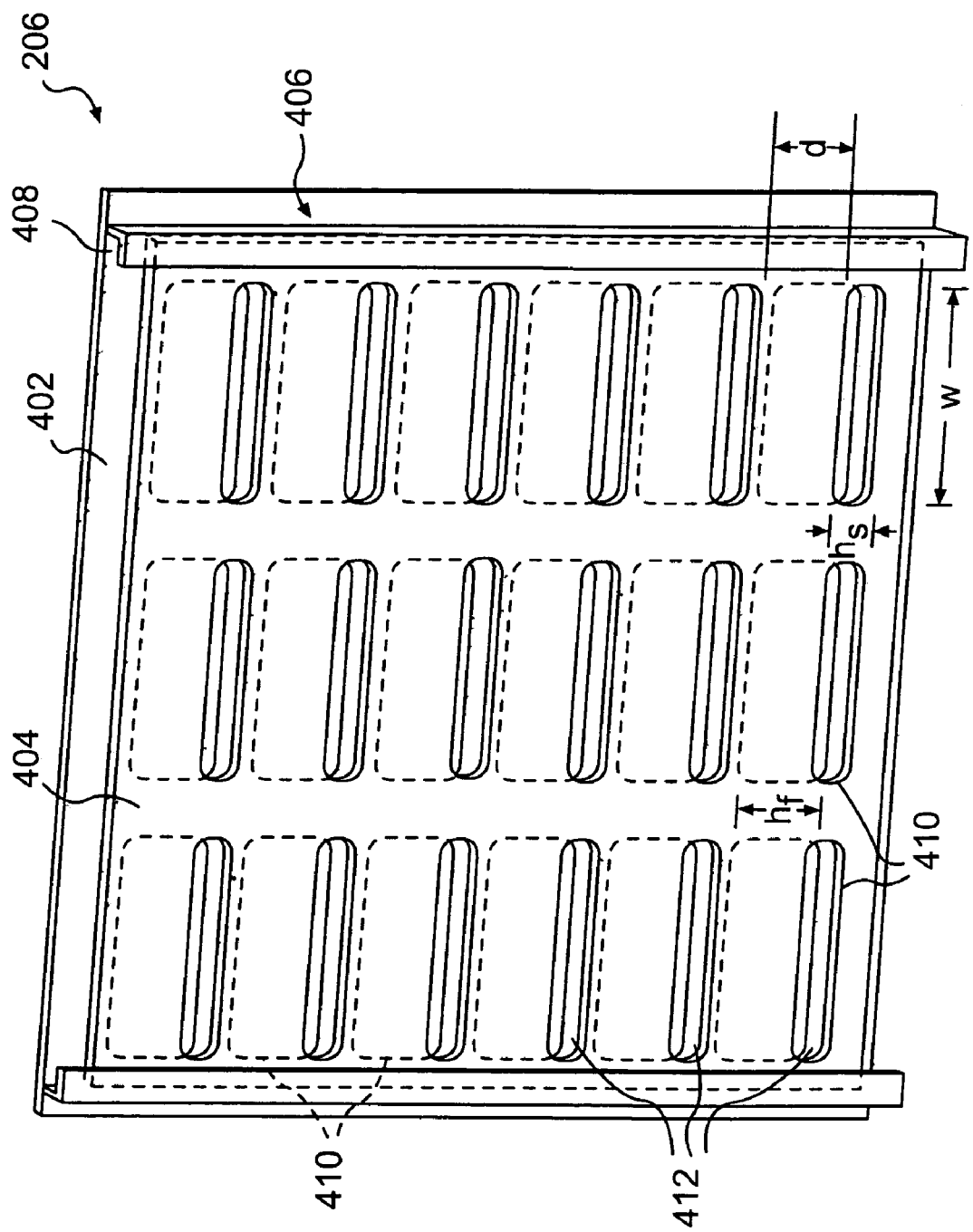
FIG. 4A is a pictorial representation of an exemplary flow regulator in a partially open position.
Figure 4B:
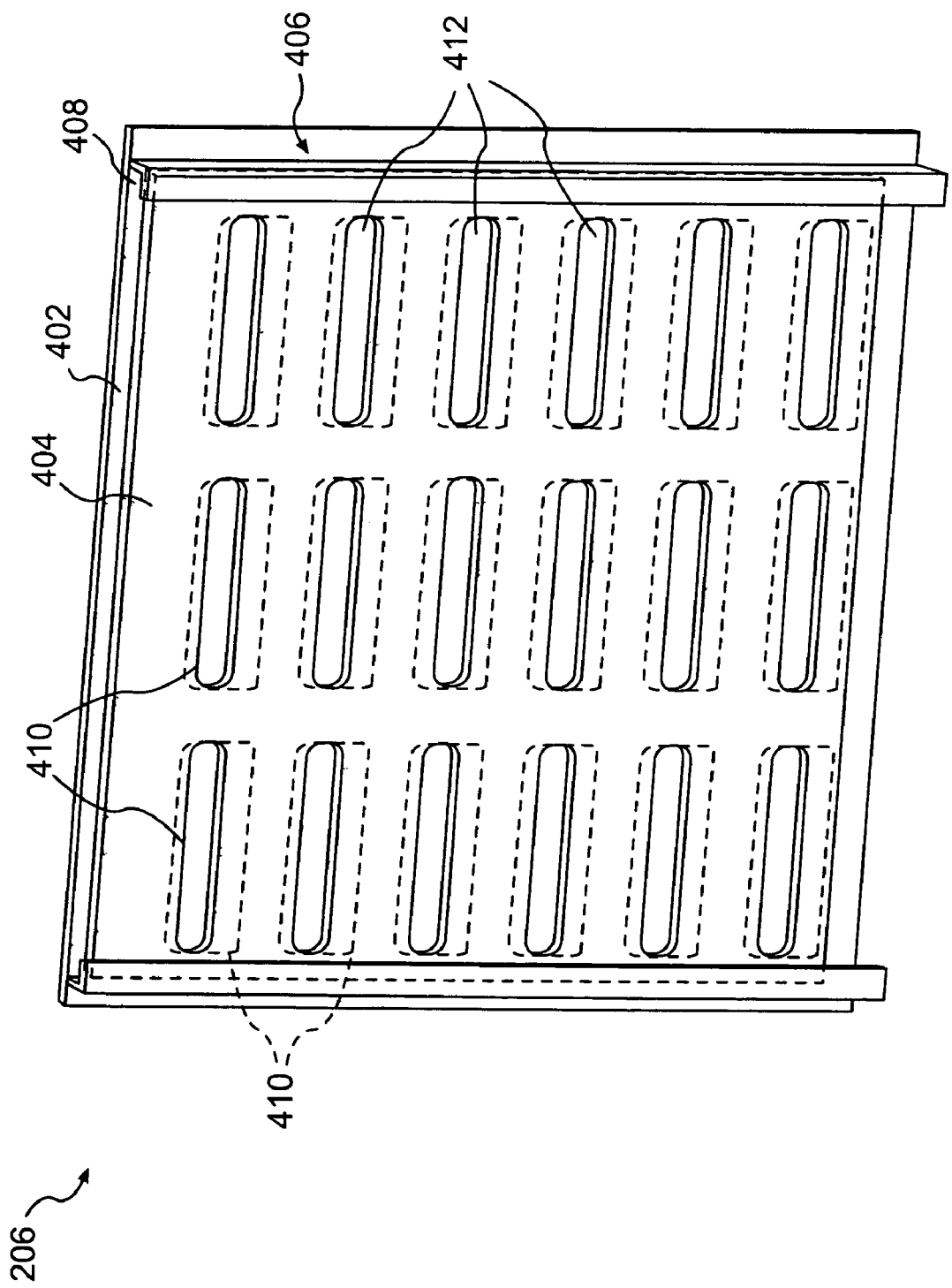
FIG. 4B is a pictorial representation of the flow regulator of FIG. 4A in a fully opened position.
Figure 4C:
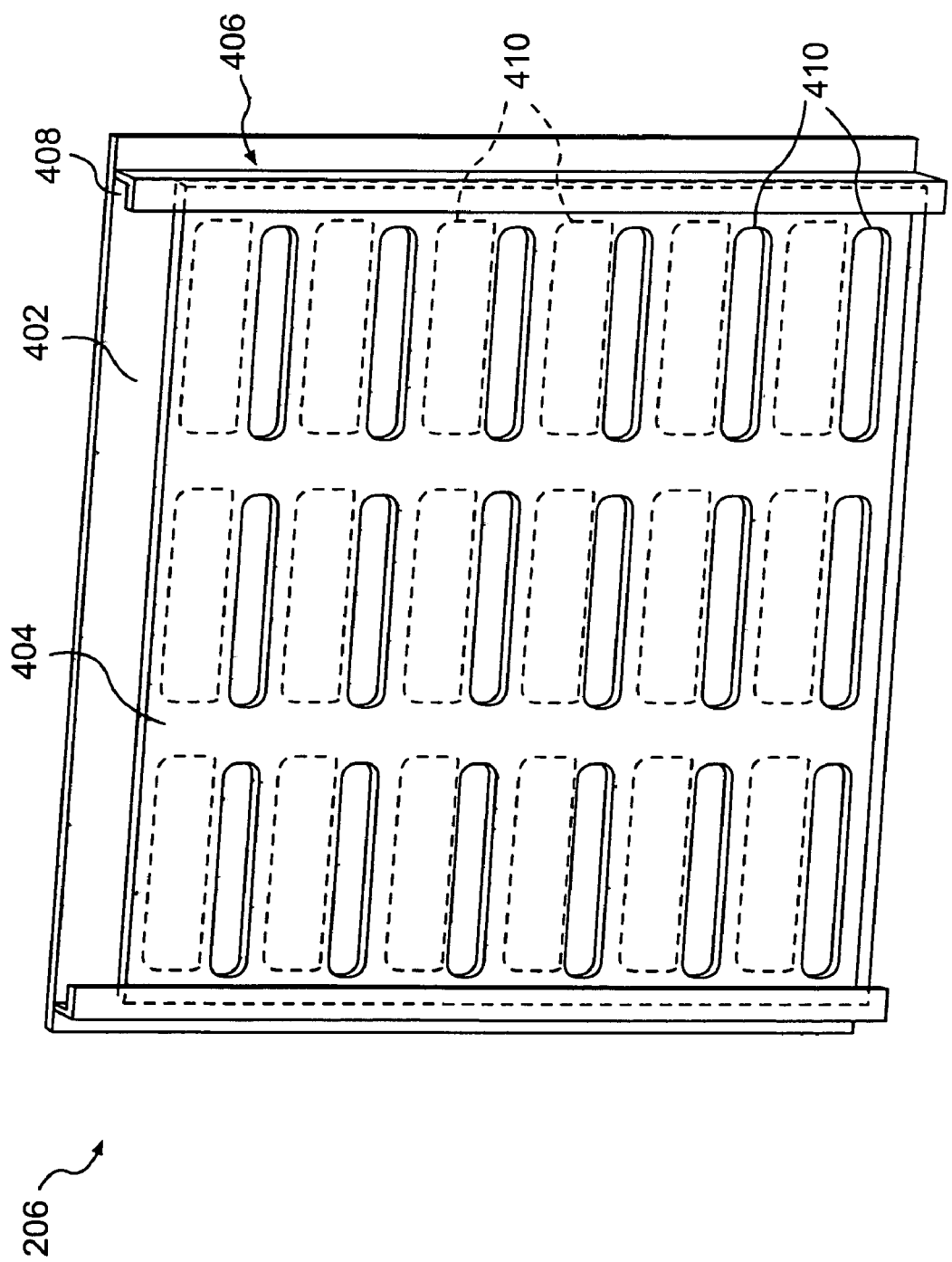
FIG. 4C is a pictorial representation of the flow regulator of FIG. 4A in a fully closed position.

With reference to FIGS. 4A–4C, the regulator 206 may be a register type regulator including a first fixed plate 402 and a second sliding plate 404. The fixed plate 402 includes a rail 406 at each side defining guides 408 that slidably receive and guide the sliding plate 404. The rails 406 also maintain the sliding plate 404 in a position that is directly adjacent to the fixed plate 402. In one exemplary embodiment, the rails 406 are angle brackets fixedly secured to, and thereby forming a part of, the fixed plate 402. It should be noted that the fixed plate 402 need not include rails 406, but that any fixture could be used to guide the sliding plate 404. In one exemplary embodiment, the rails 406 are part of the sliding plate 404 and, in another embodiment, a separate guide that is not part of the plates 402, 404 is used to guide and maintain the fixed and sliding plates 402, 404 directly adjacent each other.

The sliding plate 404 may be associated with the fixed plate 402 in a manner such that it may linearly slide relative to the fixed plate 402. In the exemplary embodiment shown, the sliding plate 404 is disposed slidably within the guides 408, and therefore, may linearly move back and forth within the guides 408 relative to the fixed plate 402.

Each of the fixed plate 402 and the sliding plate 404 includes a number of orifices 410 through the plates 402, 404. Throughout this disclosure, at least a part of the orifices 410 in the fixed plate 402 are shown in dashed or hidden lines, as the fixed plate 402 is shown behind the sliding plate 404. With reference to FIG. 4A, the orifices 410 in each of the fixed and sliding plates 402, 404 are substantially rectangular-shaped orifices having a width w and a height, with the width w being greater than the height. In one exemplary embodiment, the orifices 410 in the fixed plate 402 have a height $h_f$ that is at least double, or at least twice as large as, a height $h_s$ of the orifices 410 in the sliding plate 404. In addition, the orifices 410 in the sliding plate 404 are spaced apart by a distance d. In this embodiment, the distance d is equal to or greater than the height $h_f$ of the orifices in the fixed plate 402.

As the sliding plate 404 slides linearly back and forth relative to the fixed plate 402, the orifices 410 align to form airflow passages 412 through the plates 402, 404, of a variable size, thereby regulating the airflow through the plates 402, 404. As is shown in FIG. 4A, the sliding plate 404 may be positioned relative to the fixed plate 402 so that the passages 412 formed by the orifices 410 are only partially open. FIG. 4B shows the passages formed by the orifices 410 fully open. Finally, FIG. 4C shows the sliding plate 404 positioned relative to the fixed plate 402 in a manner that there are no passages formed by the orifices 410 or, in other words, that the passages are closed, thereby substantially eliminating flow through the regulator 206.

Although the orifices 410 are shown as being rectangular shaped, the orifices may be formed to have shapes other than rectangular. In one exemplary embodiment, the orifices of the fixed plate have a zigzag shaped edge. Accordingly, as the sliding plate moves relative to the fixed plate, corners of the zigzagged edge may align with the sliding plate orifices so that airflow may pass through the openings at the corners of the zigzag. This may provide increased control of the airflow through the orifices. The zigzag shaped edge could be formed, for example, of a series of triangles or a series of rectangles, among other shapes. In such an embodiment, the size of passages through the orifices may be increased and decreased in a non-linear manner. In other embodiments, the edges of the orifices 410 are a shape other than a zigzag shape to provide control of the airflow. For example, the orifices could be oval shaped. The orifices may have other shapes that provide control of airflow, linearly or nonlinearly.

Returning to FIGS. 2 and 3, the actuator 210 may be mechanically associated with the first zone regulator 206 and the second zone regulator 208 to control airflow to both the first and second air zones in the vehicle 100. Configured to apply a force to move the sliding plate 404, the actuator 210 may selectively open and close the passages 412 formed by the orifices 410.

In the exemplary arrangement of FIG. 3, the actuator 210 is a rotatable motor including arms 302 that extend to connectors 304 on the sliding plate 404 of each regulator 206, 208. In this arrangement, the actuator 210 may have a 90 degree rotation range and may be configured, with the arms 302, to simultaneously control the size of the passages 412 formed by the orifices 410 of each of the first and second regulators 206, 208. To do this, as the actuator 210 turns, the arms 302 simultaneously move the sliding plates 404 for each regulator 206, 208. The actuator 210 need not be a rotatable motor, however, and may be another type of actuator. In one exemplary embodiment, the actuator 210 is a geared actuator configured to turn a worm gear and/or a rack and pinion gear. In another exemplary embodiment, the actuator turns a screw to raise and lower a screw sleeve fixed onto the sliding plate 404. It should be noted that some embodiments may include more than one actuator, with each actuator being configured to control a separate regulator. In an embodiment having orifices 410 that are configured to regulate the airflow in a non-linear manner, the actuator 210 may also incorporate non-linear features that may work together with the shape of the orifices 410 to provide desired airflow. Other actuators would be apparent to one skilled in the art.

It should be noted that actuator 210 and regulators 206, 208 may be configured such that the passages 412 through one of the regulators 206, 208 are the same size or a different size than the passages 412 through the other of the regulators, 206, 208. This allows the airflow, independently requested by the input devices 202, 204, to pass through the regulators 206, 208. To do this, the actuator 210 and the first and second zone regulators 206, 208 are disposed in a manner that the position of the sliding plate 404 relative to the fixed plate 402 may be the same or different for each regulator 206, 208. As stated above, each regulator 206, 208 may include orifices 410 in the fixed plate 402 having a height $h_f$ that is at least double the height $h_s$ of the orifices 410 in the sliding plate 404. By arranging the sliding plate 404 of each regulator 206, 208 to begin in a different starting position, the same movement of the sliding plate 404 for each regulator 206, 208 by the actuator 210 may differently affect airflow through the regulators 206, 208. In the exemplary embodiment described, the actuator 210 is configured to adjust the first and second regulators 206, 208 to any of the five conditions listed in the table below. It should be noted that the amount that either regulator is partially open is also adjustable as desired.

TABLE

| Condition | First Airflow Regulator 206 | Second Airflow Regulator 208 |
|---|---|---|
| 1 | Fully Open | Closed |
| 2 | Fully Open | Partially Open |
| 3 | Fully Open | Fully Open |
| 4 | Partially Open | Fully Open |
| 5 | Closed | Fully Open |

The blower 212 may be disposed adjacent the regulators 206, 208 and may be configured to generate airflow through the regulators 206, 208 when the passages 412 formed by the orifices 410 are at least partially open. The blower 212 may be a variable speed blower, controllable based on the amount of airflow desired. In one exemplary embodiment, the blower is an electrically powered blower that may draw power from storage units (not shown), such as batteries. Accordingly, the blower 212 may not be dependent on engine speed to provide the desired airflow.

The control module 214 may include a processor and a memory and may be in communication with the first air zone input device 202, the second air zone input device 204, the actuator 210, and the blower 212. The control module 214 is configured to receive an input signal from one or both of the first and second input devices 202, 204 and, based on the input signal(s), generate an actuator control signal and a blower control signal. These control signals are communicated from the control module 214 to the actuator 210 and the blower 212, respectively, to control the actuator 210 and the blower 212 in order to provide the desired airflow to the first and second air zones. The actuator control signal is representative of a command to move the actuator 210 to open, partially open, or close the passages 412 formed by the orifices 410 in the plates 402, 404 of the regulators 206, 208. The blower control signal is representative of a command to operate the blower 212 to generate a desired amount of airflow to the first and/or second air zones.

The control module 214 may include a look-up table stored therein and, using the look-up table, may be configured to generate actuator and blower control signals that correspond to the input signals from the first and second air zone input devices 202, 204. In one exemplary embodiment, the first and second air zone input devices 202, 204 each may provide, for example, five selectable airflow speeds, thereby providing a total of twenty-five different combinations of settings. For each of the twenty-five different combinations of settings from the input devices 202, 204, the look-up table may be configured to provide a desired actuator position and blower speed. Based on the desired actuator position and the desired blower speed from the look-up table, the control module 214 may generate the actuator and blower control signals to open the regulators 206, 208 and provide the desired airflow to each air zone.

Figure 5:
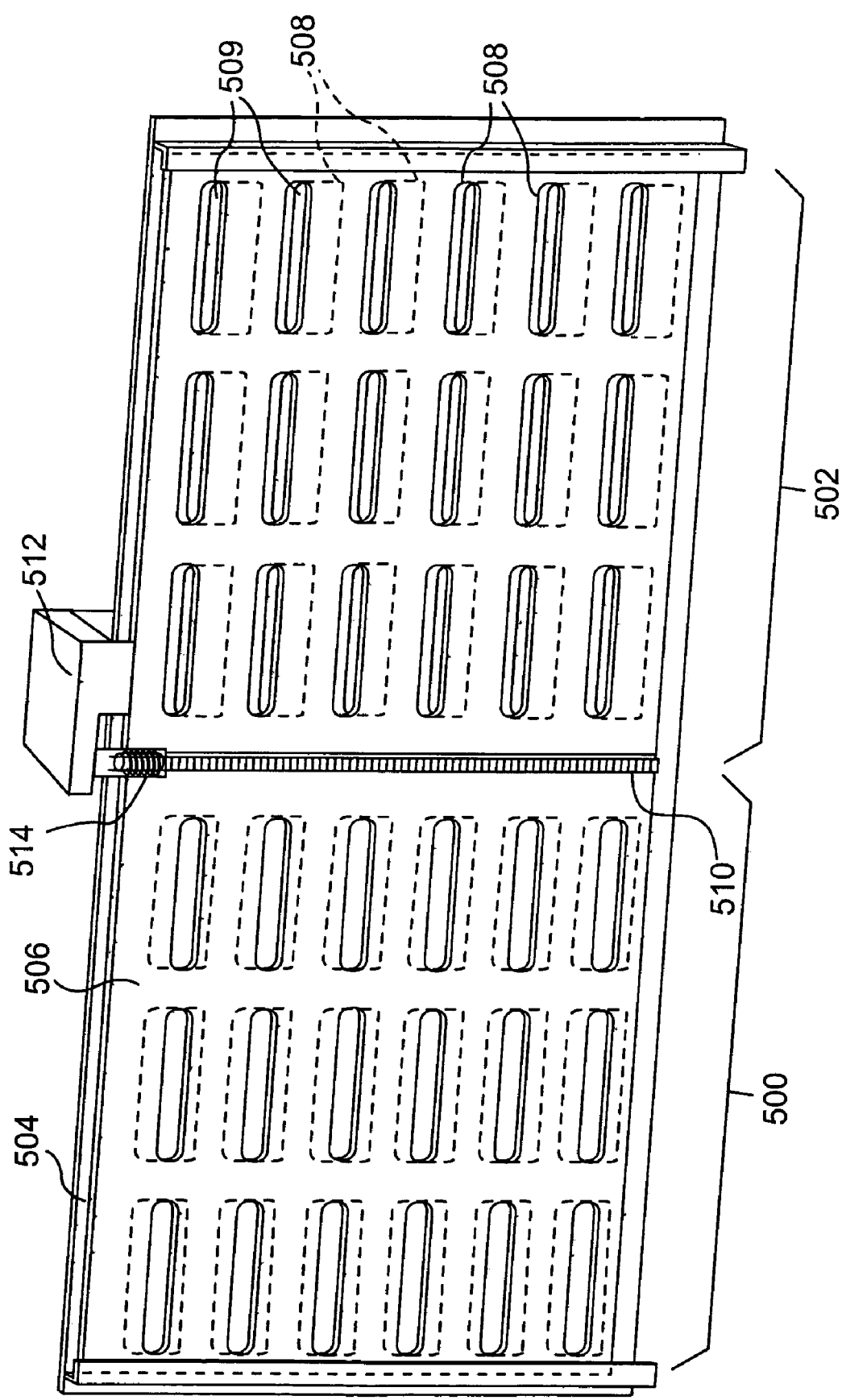
FIG. 5 is a pictorial representation of an alternative embodiment of a flow regulator.

FIG. 5 shows one exemplary alternate embodiment of a first and a second airflow regulator 500, 502 for use in the airflow control assembly 107. Like the regulators 206, 208 described above, each of the regulators 500, 502 include a fixed plate 504 and a sliding plate 506. In this exemplary embodiment, the regulators 500, 502 share a common fixed plate 504 and a common sliding plate 506. The common fixed plate 504 and the common sliding plate 506 each include orifices 508, as described above, that may form adjustably sized passages 509 therethrough. However, the orifices 508 in the first regulator 500 are offset from the orifices 508 in the second regulator 502 so that the airflow through both the first and second regulators 500, 502 does not always correspond. Therefore, depending on the position of the plates 504, 506 relative to each other, the airflow passages through the orifices 508 in the first and second regulators 500, 502 may be open, partially open, or closed in the manner described above.

In the embodiment of FIG. 5, the sliding plate 506 includes a gear rack 510. An actuator 512 includes a worm gear 514 having gear teeth operably engaged with rack teeth of the gear rack 510. The actuator 512 may be configured to rotate the worm gear 514 to move the sliding plate 506 relative to the fixed plate 504. It should be noted that the actuator 512 could be used in place of the actuator 210, or alternatively, any other actuator capable of moving the sliding plate 506 relative to the fixed plate 504 may be used. Thus, by controlling the actuator position and by controlling the blower speed, based on the actuator control signal and the blower control signal, the airflow to each air zone may be regulated by the regulators 500, 502 in the manner desired by an operator.

Figure 6:
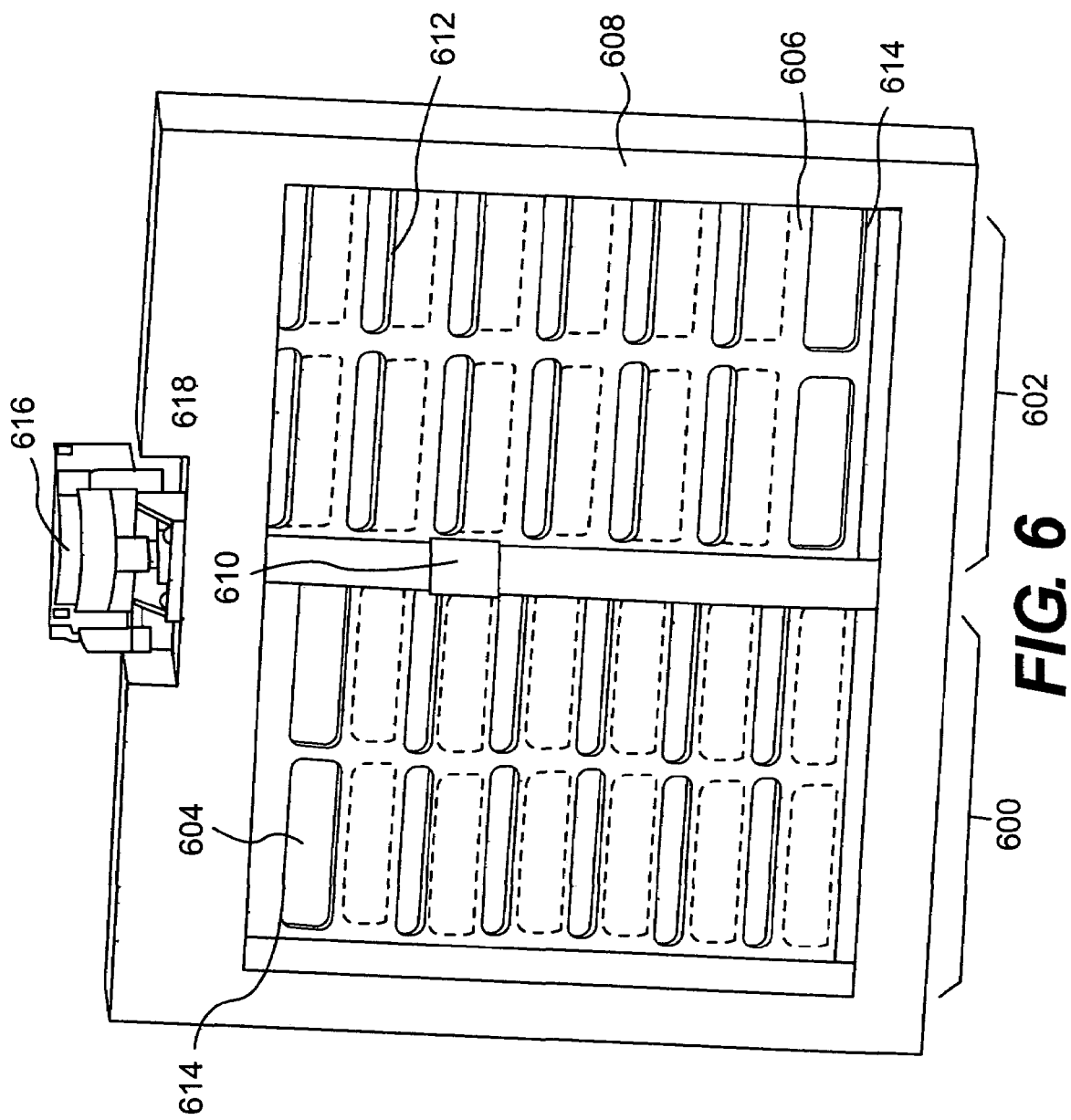
FIG. 6 is a pictorial representation of another alternative embodiment of a flow regulator.

FIG. 6 shows another exemplary embodiment of first and second airflow regulators 600, 602. The regulators 600, 602 include a common fixed plate 604 and a common sliding plate 606. A frame 608 houses the fixed and sliding plates 604, 606, and allows the sliding plate 606 to move linearly relative to the fixed plate 604. A screw sleeve 610 is attached to the sliding plate 606. Orifices 612 are arranged as described above with the addition that an end orifice 614 in each regulator of the sliding plate 606 is approximately the same size as the orifices 612 in the fixed plate 604. This allows increased flow through the end orifice 614 when the regulators 600, 602 are fully opened. An actuator 616 turns a screw 618 extending through the screw sleeve 610 to linearly move the sliding plate 606 relative to the fixed plate 604. It should be noted that any of the features mentioned in any embodiment may be used with any other embodiment disclosed herein.

INDUSTRIAL APPLICABILITY

The airflow control assembly 107 described herein is capable of providing a desired airflow to more than one air zone in the vehicle 100. It may accomplish this using fewer components than prior systems by providing a single blower 212 that provides air flow to more than one air zone in the vehicle 100. In addition, the airflow control assembly may adjust the size of passages through the regulators using a single actuator. Use of the single blower 212 and/or the single actuator 210 may assist in keeping component costs down and may reduce the occurrence of breakdowns. In addition, the use of fewer components decreases the size of the airflow control assembly 107, providing more options for placement on the vehicle 100.

The operation of the airflow control system 200 will be described with reference to the regulators 206, 208 of the first embodiment. It should be noted that the operation is equally applicable to each embodiment described herein. In each embodiment described, the regulators 206, 208 are configured to open the passages 412 through one of the regulators 206, 208 the same amount or a different amount than the passages 412 through the other of the regulators 206, 208. To provide the same airflow through the both regulators 206, 208, the passages may be sized about the same, and the blower 212 may be powered to provide the desired airflow. To provide a different airflow, the size of the passages 412 through the regulators 206, 208 are adjusted as necessary and the blower speed is controlled to provide the desired airflow.

To use the airflow control system 200, an operator may select the desired airflow using the first and second air zone input devices 202, 204. The first and second air zone input devices 202, 204 communicate an input signal that is indicative of the operator's selection to the control module 214.

The control module 214 may store a look-up table therein that provides a desired actuator position and a desired blower speed for each combination of input signals from the input devices 202, 204. Based on the desired actuator position, the control module 214 may generate an actuator control signal and communicate it to the actuator 210. The actuator 210 then may move the sliding plate 404 relative to the fixed plate 402, thereby opening, partially opening, or closing passages 412 formed by the orifices 410 to provide a desired sized passage through the regulators 206, 208.

Based on the desired blower speed from the look-up table, the control module 214 may generate a blower control signal and communicate it to the blower 212 to control the speed of the blower 212. Accordingly, the blower 212 may provide airflow at a rate desired to provide the desired airflow to the first and second air zones in the vehicle 100.

It should be noted that the blower 212 may be a variable speed, electrically driven blower, and therefore, may not be directly dependent on the engine speed for power. Accordingly, the blower 212 may provide the desired airflow to one or both of the air zones without regard to engine speed, providing a more consistent and reliable blower.

Although the airflow control system 200 is disclosed for use on a vehicle 100 having an operator cab 110 and a sleeper cabin 108, the system 200 may be used on any vehicle where separate temperature control of a first air zone and a second air zone is desired. Further, it should be noted that the first and second air zones need not be separated by physical barriers, but could include different regions within the same passenger compartment.

It will be apparent to those skilled in the art that various modifications and variations can be made in the disclosed embodiments without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A dual airflow control system for an environment having a first air zone and a second air zone, comprising:
   a first input device operable to generate a first input signal indicative of a desired airflow to the first zone;
   a second input device operable to generate a second input signal indicative of a desired airflow to the second zone;
   first and second flow regulators configured to regulate airflow to the first and second zones, respectively, such that the first and second regulators selectively provide airflow to each of the first and second zones based on the first and second input signals, the first and second flow regulators each including a first plate having first orifices formed therein, and a second plate having second orifices formed therein, the second plate being configured to move relative to the first plate in a manner that the first and second orifices define passages configured to selectively open and close to regulate the airflow to the first and second zones; and a single actuator associated with the first and second flow regulators and operable to simultaneously actuate the first and second flow regulators independently based on an input from the first and second input devices to allow the desired airflows to the first and the second zones.

2. The airflow control system of claim 1, wherein at least one orifice of one of the first and second orifices has a height that is at least twice as large as the height of at least one orifice of the other of the first and second orifices.

3. The airflow control system of claim 2, wherein at least one second orifice in the second plate is sized to be substantially the same size as at least one of the first orifices in the first plate.

4. The airflow control system of claim 1, wherein the second plate is common to both the first and second flow regulators.

5. The airflow control system of claim 1, including a single variable speed blower disposed to generate airflow to both the first and second flow regulators.

6. The airflow control system of claim 5, including a controller operable to receive the first and second input signals from the first and second input devices and generate
an actuator control signal based on the first and second input signals, the controller being operable to communicate the actuator control signal to the actuator to control the first and second flow regulators, and
a blower control signal based on the first and second input signals, the controller being operable to communicate the blower control signal to the blower to produce the first and the second desired airflows.

7. The airflow control system of claim 6, wherein the controller includes a look-up table stored therein, the controller being configured to generate the actuator and blower control signals based on the information in the look-up table.

8. A method of operating a dual airflow control system for an environment having a first air zone and a second air zone, comprising:
generating a first input signal indicative of a desired airflow to the first zone;
generating a second input signal indicative of a desired airflow to the second zone;
regulating airflow to the first and second zones with a first and a second flow regulator, respectively, in a manner that selectively provides the airflow based on the first and second input signals;
simultaneously actuating the first and second flow regulators independently with a single actuator to allow the desired airflows to the first and the second zones based on the first and second input signals; and
generating airflow to both the first and second flow regulators through a single variable speed blower.

9. The method of claim 8, wherein regulating airflow includes moving a second plate relative to a first plate in a manner that passages defined by first orifices in the first plate and second orifices in the second plate selectively open and close.

10. The method of claim 8, including:
receiving the first and second input signals from the first and second input devices at a controller;
generating an actuator control signal based on the first and second input signals;
communicating the actuator control signal to the actuator to control the first and second flow regulators;
generating a blower control signal based on the first and second input signals; and
communicating the blower control signal to the blower to produce the first and the second desired airflows.

11. The method of claim 10, wherein generating the actuator control signal and generating the blower control signal each include considering information stored in a look-up table.

12. A dual airflow control system for a vehicle having a first air zone and a second air zone, comprising:
a first input device operable to generate a first input signal indicative of a desired airflow to the first zone;
a second input device operable to generate a second input signal indicative of a desired airflow to the second zone;
first and second flow regulators configured to regulate airflow to the first and second zones, respectively, such that the first and second regulators selectively provide the airflow to each zone based on the first and second input signals;
a single blower configured to create an airflow for passage through both the first and second flow regulators based on the first and second input signals from the first and second input devices to provide the desired airflows to the first and second zones; and
a single actuator associated with the first and second flow regulators and operable to simultaneously actuate the first and second flow regulators independently based on an input from the first and second input devices to allow the desired airflows to the first and the second zones.

13. The airflow control system of claim 12, wherein the blower is an electrically powered blower.

14. The airflow control system of claim 12, including a controller operable to receive the first and second input signals from the first and second input devices and generate
an actuator control signal based on the first and second input signals, the controller being operable to communicate the actuator control signal to the actuator to control the first and second flow regulators; and
a blower control signal based on the first and second input signals, the controller being operable to communicate the blower control signal to the blower to produce the first and the second desired airflows.

15. The airflow control system of claim 14, wherein the controller includes a look-up table stored therein, the controller being configured to generate the actuator and blower control signals based on the information in the look-up table.

16. A method of controlling a dual airflow control system for a vehicle having a first air zone and a second air zone, comprising:
generating a first input signal indicative of a desired airflow to the first zone;
generating a second input signal indicative of a desired airflow to the second zone;
regulating airflow to the first and second zones with first and second regulators, respectively, in a manner that selectively allows the airflow to each zone to be the same or different based on the first and second input signals;
creating an airflow for passage through both the first and second flow regulators with a single blower based on the first and second input signals from the first and second input devices;
simultaneously actuating the first and second flow regulators independently with a single actuator to allow the desired airflows to the first and the second zones based on the first and second input signals;
receiving the first and second input signals from the first and second input devices at a controller;
generating an actuator control signal based on the first and second input signals;

communicating the actuator control signal to the actuator to control the first and second flow regulators;

generating a blower control signal based on the first and second input signals: and communicating the blower control signal to a blower to produce the first and the second desired airflows.

17. The method of claim 16, wherein generating the actuator control signal and generating the blower control signal each include considering information stored in a look-up table.

18. A vehicle, comprising:
an operator compartment having a first air zone and a second air zone; and
a dual airflow control system, including
a first input device operable to generate a first input signal indicative of a desired airflow to the first zone;
a second input device operable to generate a second input signal indicative of a desired airflow to the second zone;
first and second flow regulators for regulating airflow to the first and second zones, respectively;
a single actuator for simultaneously actuating the first and second flow regulators independently;
a single variable speed blower disposed to selectively generate airflow through the first and second flow regulators; and
a controller operable to receive the first and second signals from the first and second input devices and generate an actuator control signal and a blower control signal based on the first and second input signals, the controller being operable to communicate the actuator and blower control signals to the actuator and blower, respectively, to produce the first and the second desired airflows.

19. The vehicle of claim 18, wherein the first and second flow regulators each include:
a first plate having first orifices formed therein, and
a second plate having second orifices formed therein, the second plate being configured to move relative to the first plate in a manner that the first and second orifices define passages configured to selectively open and close to regulate the airflow to the first and second air zones.

20. The vehicle of claim 19, wherein at least one orifice of one of the first and second orifices has a height that is at least twice as large as the height of at least one orifice of the other of the first and second orifices.

21. The vehicle of claim 18, wherein the controller includes a look-up table stored therein, the controller being configured to generate the actuator and blower control signals based on the information in the look-up table.

* * * * *